(12) United States Patent
Chayat et al.

(10) Patent No.: US 11,038,819 B2
(45) Date of Patent: Jun. 15, 2021

(54) TECHNOLOGIES FOR EXTRACTING EXTRINSIC ENTROPY FOR WORKLOAD DISTRIBUTION

(71) Applicant: Intel Corporation, Santa Clara, CA (US)

(72) Inventors: Ronen Chayat, Haifa (IL); Andrey Chilikin, Limerick (IE); Chris Macnamara, Limerick (IE); Maryam Tahhan, Limerick (IE); Giovanni Cabiddu, Shannon (IE)

(73) Assignee: Intel Corporation, Santa Clara, CA (US)

( * ) Notice: Subject to any disclaimer, the term of this patent is extended or adjusted under 35 U.S.C. 154(b) by 809 days.

(21) Appl. No.: 15/637,724

(22) Filed: Jun. 29, 2017

(65) Prior Publication Data
US 2019/0007347 A1   Jan. 3, 2019

(51) Int. Cl.
*G06F 9/50* (2006.01)
*H04L 12/861* (2013.01)
*H04L 12/935* (2013.01)
*H04L 12/863* (2013.01)
*H04L 12/24* (2006.01)
*H04L 12/801* (2013.01)
*H04L 12/813* (2013.01)
*H04L 12/26* (2006.01)

(52) U.S. Cl.
CPC .......... *H04L 49/90* (2013.01); *H04L 47/50* (2013.01); *H04L 49/3027* (2013.01); *H04L 41/0803* (2013.01); *H04L 43/0817* (2013.01); *H04L 47/10* (2013.01); *H04L 47/20* (2013.01); *H04L 47/622* (2013.01); *H04L 49/30* (2013.01)

(58) Field of Classification Search
None
See application file for complete search history.

(56) References Cited

U.S. PATENT DOCUMENTS

| 5,859,835 | A | * | 1/1999 | Varma | H04L 49/3081 370/229 |
| 9,749,255 | B2 | * | 8/2017 | Sukonik | H04L 47/6255 |
| 2002/0097734 | A1 | * | 7/2002 | Amou | H04Q 11/0478 370/412 |
| 2002/0150115 | A1 | * | 10/2002 | Onvural | H04Q 11/0478 370/411 |
| 2003/0202517 | A1 | * | 10/2003 | Kobayakawa | H04L 47/24 370/395.4 |
| 2006/0041667 | A1 | * | 2/2006 | Ahn | H04L 47/50 709/229 |

(Continued)

*Primary Examiner* — Sithu Ko
(74) *Attorney, Agent, or Firm* — Compass IP Law PC

(57) ABSTRACT

Technologies for distributing network packet workload are disclosed. A compute device may receive a network packet and determine network packet extrinsic entropy information that is based on information that is not part of the contents of the network packet, such as an arrival time of the network packet. The compute device may use the extrinsic entropy information to assign the network packet to one of several packet processing queues. Since the assignment of network packets to the packet processing queues depend at least in part on extrinsic entropy information, similar or even identical packets will not necessarily be assigned to the same packet processing queue.

21 Claims, 6 Drawing Sheets

(56) References Cited

U.S. PATENT DOCUMENTS

| | | | |
|---|---|---|---|
| 2014/0169517 A1* | 6/2014 | Dinkjian | G06F 12/00 377/20 |
| 2014/0293794 A1* | 10/2014 | Zhong | H04L 47/215 370/235.1 |
| 2016/0028544 A1* | 1/2016 | Hyde | G06F 3/0637 380/44 |
| 2016/0226787 A1* | 8/2016 | Kiaei | H04L 49/10 |
| 2016/0283283 A1* | 9/2016 | Jung | G06F 9/5033 |
| 2018/0210756 A1* | 7/2018 | Ranganathan | G06F 9/542 |
| 2018/0351692 A1* | 12/2018 | Rozenboim | H04L 47/125 |
| 2019/0258631 A1* | 8/2019 | Pal | G06F 16/2425 |

* cited by examiner

TECHNOLOGIES FOR EXTRACTING EXTRINSIC ENTROPY FOR WORKLOAD DISTRIBUTION

BACKGROUND

Network interface controllers (NICs) manage several tasks related to managing received network packets, including determining how or where an incoming network packet is processed. In a compute device with a single processor core, a NIC may not need to make a determination of where an incoming packet should be processed, since there is only one option, the single processor core. However, in compute devices with multiple processor cores or other hardware which can process network packets, performance of the compute device may be improved if the NIC distributes the workload of processing incoming packets to the various processor cores or other hardware.

In order to distribute the workload of processing incoming network packets, a NIC may analyze various aspects of an incoming network packet, such as the protocol used (e.g., TCP vs. UDP), whether the network packet is a tunneled packet, etc., and determine where the network packet should be processed based on those aspects of the network packet. Such an approach may work well when there is a suitable distribution of network packets with sufficiently different characteristics that the network packets are evenly distributed.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
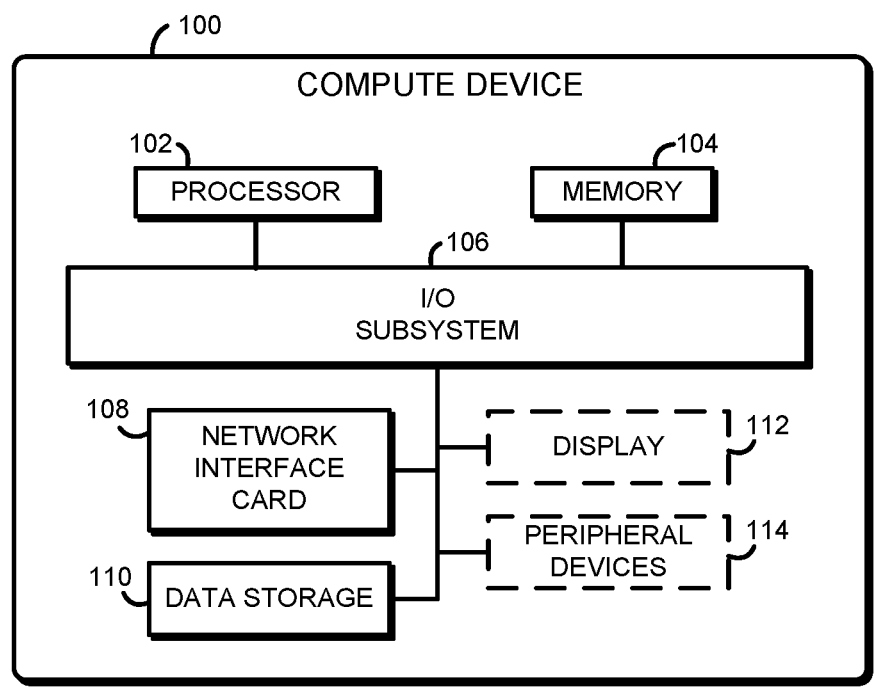
FIG. 1 is a simplified block diagram of at least one embodiment of a compute device for distributing network packet workload.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 is configured to receive network packets with a network interface controller 108. The illustrative compute device 100 may include one or more processors 102. In the illustrative embodiment, the compute device 100 classifies each network packet based on information contained in the network packet, such as whether the packet is a Transmission Control Protocol (TCP) packet, a User Datagram Protocol (UDP) packet, an Internet Protocol Security (IPSec) packet, etc. Based on the classification of the network packet, the compute device 100 determines an entropy profile for the network packet.

The entropy profile may indicate what information is used to determine which network packet processing queue the network packet should be sent to. In one example, an entropy profile may indicate that only information intrinsic to the network packet, such as the Internet Protocol (IP) address associated with the source or destination of the packet, should be used to determine which network packet processing queue the network packet should be sent to. In another example, an entropy profile may indicate that information extrinsic to the contents of the network packet, such as arrival time or arrival order of the network packet, should be used to determine which network packet processing queue the network packet should be sent to. As used herein, the content of the network packet includes any part of the network packet, including headers, payload, etc. It should be appreciated that if only information intrinsic to the contents of the network packet is used to determine which network packet processing queue is used, then, if there is a stream of network packets with the same or substantially similar intrinsic entropy information, the compute device 100 may send many or all of those network packets to the same network packet processing queue, leading to that queue being overloaded. In contrast, when using extrinsic entropy information, when a stream of network packets with the same or substantially similar intrinsic information arrive at the compute device, 100, the compute device 100 may distribute those network packets more evenly among the network packet processing queues that would be the case if using intrinsic information only. This more even distribution is one advantage that may be present in some embodiments of the illustrative compute device 100.

The compute device 100 may be embodied as any type of compute device capable of receiving network packets and performing the functions described herein. For example, the compute device 100 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. The illustrative compute device 100 includes the processor 102, a memory 104, an input/output (I/O) subsystem 106, the network interface controller 108, and data storage 110. In some embodiments, one or more of the illustrative components of the compute device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. In some embodiments, the compute device 100 may include more than one processor 102, each of which may have more than one processor core. The memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100 on a single integrated circuit chip.

The network interface controller 108 may be embodied as any type of interface capable of interfacing the compute device 100 with other compute devices, such as over a network. In some embodiments, the network interface controller 108 may be referred to as a host fabric interface (HFI). The network interface controller 108 may be capable of interfacing with any appropriate cable type, such as an electrical cable or an optical cable, and/or may be capable of interfacing with a wireless signal, such as through one or more antennae. The network interface controller 108 may be configured to use any one or more communication technology and associated protocols (e.g., Ethernet, Bluetooth®, Wi-Fi®, WiMAX, near field communication (NFC), etc.). The network interface controller 108 may be located on silicon separate from the processor 102, or the network interface controller 108 may be included in a multi-chip package with the processor 102, or even on the same die as the processor 102. The network interface controller 108 may be embodied as one or more add-in-boards, daughtercards, network interface cards, controller chips, chipsets, specialized components such as a field programmable gate array (FPGA) or application specific integrated circuit (ASIC), or other devices that may be used by the compute device 100 to connect with another compute device. In some embodiments, network interface controller 108 may be embodied as part of a system-on-a-chip (SoC) that includes one or more processors, or included on a multichip package that also contains one or more processors. In some embodiments, the network interface controller 108 may include a local processor (not shown) and/or a local memory (not shown) that are both local to the network interface controller 108. In such embodiments, the local processor of the network interface controller 108 may be capable of performing one or more of the functions of the processor 102 described herein. Additionally or alternatively, in such embodiments, the local memory of the network interface controller 108 may be integrated into one or more components of the compute device 100 at the board level, socket level, chip level, and/or other levels.

The data storage 110 may be embodied as any type of device or devices configured for the short-term or long-term storage of data. For example, the data storage 110 may include any one or more memory devices and circuits, memory cards, hard disk drives, solid-state drives, or other data storage devices.

In some embodiments, the compute device 100 may include other or additional components, such as those commonly found in a compute device. For example, the compute device 100 may also have a display 112 and/or peripheral devices 114. The peripheral devices 114 may include a keyboard, a mouse, etc. The display 112 may be embodied as any type of display on which information may be displayed to a user of the compute device 100, such as a touchscreen display, a liquid crystal display (LCD), a light emitting diode (LED) display, a cathode ray tube (CRT) display, a plasma display, an image projector (e.g., 2D or 3D), a laser projector, a heads-up display, and/or other display technology.

Figure 2:
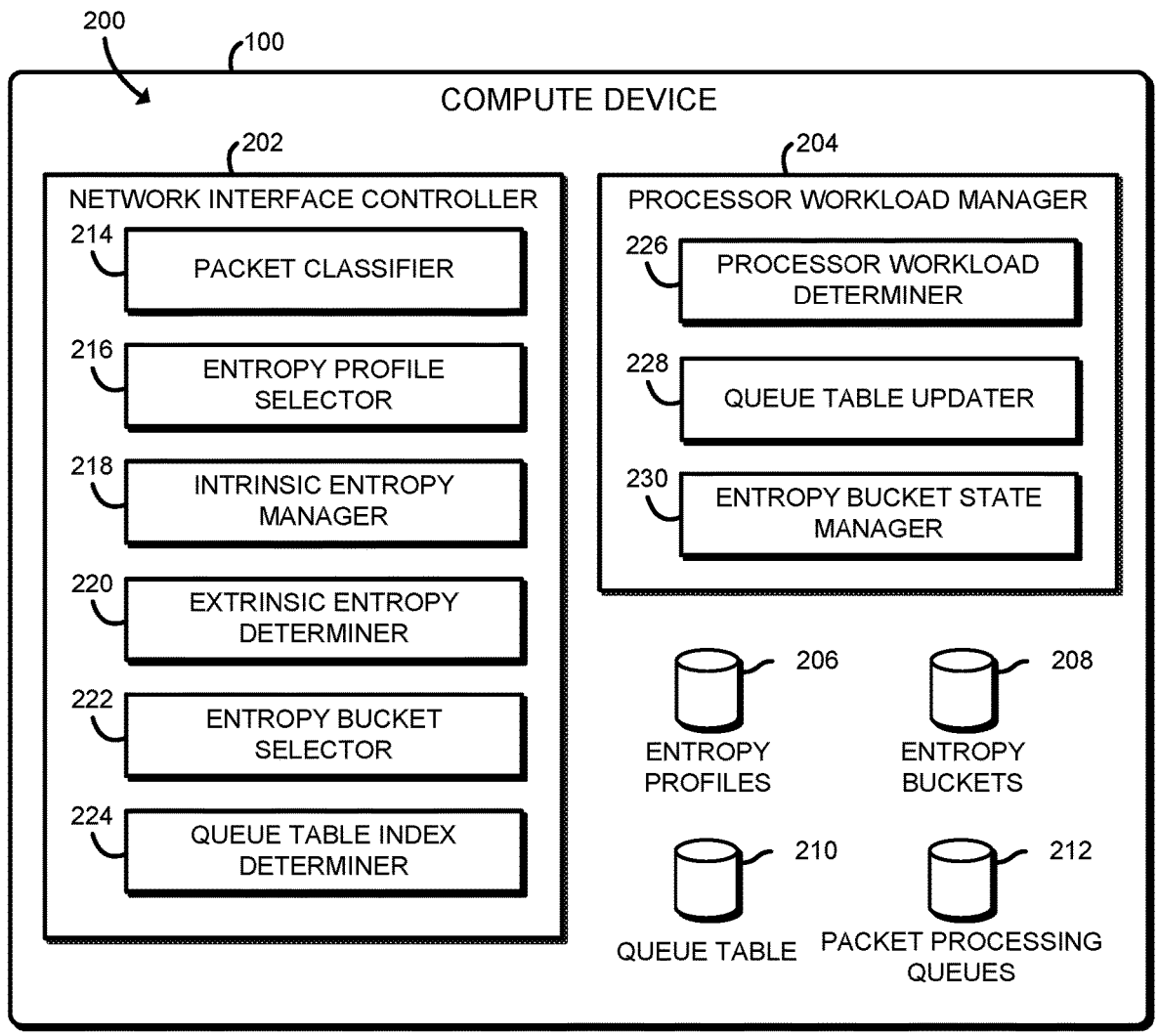
FIG. 2 is a block diagram of at least one embodiment of an environment that may be established by the compute device of FIG. 1.

Referring now to FIG. 2, in an illustrative embodiment, the compute device 100 establishes an environment 200 during operation. The illustrative environment 200 includes a network interface controller 202, a processor workload manager 204, entropy profiles 206, entropy buckets 208, a queue table 210, and packet processing queues 212. The various modules of the environment 200 may be embodied as hardware, software, firmware, or a combination thereof. For example, the various modules, logic, and other components of the environment 200 may form a portion of, or otherwise be established by, the processor 102 or other hardware components of the compute device 100 such as the network interface controller 108. As such, in some embodiments, one or more of the modules of the environment 200 may be embodied as circuitry or collection of electrical devices (e.g., a network interface controller circuit 202, a processor workload manager circuit 204, etc.). It should be appreciated that, in such embodiments, one or more of the circuits (e.g., the network interface controller circuit 202, the processor workload manager circuit 204, etc.) may form a portion of one or more of the processor 102, the memory 104, the I/O subsystem 106, the network interface controller 108, the data storage 110, and/or other components of the compute device 100. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 102 or other components of the compute device 100.

The network interface controller 202, which may be embodied as hardware, firmware, software, virtualized hardware, emulated architecture, and/or a combination thereof as discussed above, is configured to manage incoming network packets and distribute the incoming network packets into the packet processing queues 214 for further processing by, e.g., a processor 102 or a processor core associated with the processor 102. The illustrative network interface controller 202 includes a packet classifier 214, an entropy profile selector 216, and intrinsic entropy manager 218, an extrinsic entropy determiner 220, an entropy bucket selector 222, and a queue table index determiner 224.

The packet classifier 214 is configured to classify some or all of the incoming network packets. The packet classifier 214 may classify a network packet based on various factors, such as the source IP address, the source port number, the destination IP address, the destination port number, the protocol in use by the network packet, tunneling properties of the network packet, etc. In some embodiments, the packet classifier 214 may classify a network packet based on related packets that have been received over a certain previous period of time. For example, the packet classifier 214 may classify a network packet based on the number of similar network packets (e.g., network packets with some or all of the same source IP address, source port number, destination IP address, destination port number, and/or protocol in use) that have been received over a certain period of time. As discussed in more detail below, the classification of a given network packet may be used to determine which packet processing queue the network packet is assigned to.

The entropy profile selector 216 is configured to select, for each of some or all of the incoming network packets, one of the entropy profiles 206 to use in determining which of the packet processing queues 212 should be used to process the incoming network packet. As discussed in more detail below, an entropy profile may include rules or data that may be used to determine which packet processing queue the network packet is assigned to, such as whether intrinsic entropy and/or extrinsic entropy should be used in selecting the packet processing queue. The entropy profile selector 216 may use various factors to select an entropy profile for a given network packet, such as the classification of the network packet by the packet classifier 214 or a temporal characteristic of the network packet (e.g., the arrival time or arrival order of the network packet). The entropy profile selector 216 may additionally or alternatively select an entropy profile based on some or all of the same factors used to classify the network packet, such as the source IP address, the source port number, the destination IP address, the destination port number, the protocol in use by the network packet, tunneling properties of the network packet, etc. In some embodiments, if an entropy profile cannot be found or no entropy profiles 206 are available, the entropy profile 216 selector may select a default entropy profile. The default entropy profile may indicate, e.g., that the intrinsic entropy information of the network packet should be used to select the packet processing queue.

The intrinsic entropy manager 218 is configured to manage and process the entropy intrinsic to the network packet. As used herein, intrinsic entropy information associated with a network packet is any information intrinsic to a network packet that may be used in selecting one of the packet processing queues 212 to assign the network packet to, including packet headers, payload, etc. The intrinsic entropy manager 218 is configured to generate an intrinsic queue selector value based on the intrinsic entropy information which may be used to determine which packet processing queue the network packet should be assigned to. Since different network packets may have different intrinsic entropy information, the differences in the intrinsic entropy information may, in some or most cases, lead to the different network packets being approximately evenly distributed among the packet processing queues 212. For example, if two network packets have different source ports, such a difference in the intrinsic entropy information between the two packets can be a basis for assigning the network packets to different packet processing queues 212. In the illustrative embodiment, several values of the intrinsic entropy information of the network packet (such as the source IP address, the source port number, the destination IP address, the destination port number, the protocol in use by the network packet, tunneling properties of the network packet) may be combined together with a hash function to form a hash value. The hash value may then be used as the intrinsic queue selector value. It should be appreciated that different values for any of the inputs to the hash function will generally lead to a different hash value (unless there is a collision in the hash function), and will, therefore, generally lead to a different packet processing queue 212. It should also be appreciated that, if two network packets share the same values provided as input to the hash function, the hash value of the hash function will be the same for the two packets, leading to selection of the same packet processing queue 212 unless some other factor influences the selection of the packet processing queue 212. In some embodiments, the network interface controller 202 may add the hash value to a receive descriptor associated with the network packet.

The extrinsic entropy determiner 220 is configured to determine extrinsic entropy information associated with an incoming network packet. As used herein, extrinsic entropy information associated with a network packet is information associated with a network packet that is not based on information intrinsic to the content of the network packet, where the content of the network packet includes packet headers, payload, etc. Extrinsic entropy information of a network packet can include, e.g., a temporal characteristic of the network packet, such as the arrival time of the network packet or arrival order of the network packet. The arrival time of a network packet may be determined by timestamping the arrival of the network packet with any suitable timer, such as a system clock associated with the processor 102, a clock associated with the network interface controller 108, a free-running clock, a clock based on a Precision Time Protocol (PTP) such as Institute for Electrical and Electronics Engineers (IEEE) 1588-2002 published in 2002 or IEEE 1588-2008 published in 2008, etc. The arrival order of a network packet may be based on an arrival order of the network packet compared to associated network packets, such as the set of network packets associated with the same connection as the network packet. In some embodiments, the network interface controller 202 may add some or all of the extrinsic entropy information to a receive descriptor associated with the network packet, which may be used by the compute device 100 to, e.g., reconstruct the arrival order of the network packets.

The entropy bucket selector 222 is configured to select one of the entropy buckets 208 to use in determining which of the packet processing queues 212 should be used to process the incoming network packet. As discussed in more detail below, an entropy bucket may include queue selection data such as rules or data that may be used to determine an extrinsic queue selector value, which may be used to determine which packet processing queue the network packet should be assigned to. For example, the extrinsic queue selector value could be embodied as a queue index associated with an entry in the queue table 210 that may be incremented after each use. In the illustrative embodiment, the entropy bucket selector 222 is configured to select one of the entropy buckets 208 based on the extrinsic entropy information determined by the extrinsic entropy determiner 220. Additionally or alternatively, the entropy bucket selector 222 may select one of the entropy buckets 208 based on other factors, such as the classification of the network packet and/or intrinsic entropy information of the packet.

The queue table index determiner 224 is configured to determine a queue table index that indicates a particular queue entry of the queue table 210. As discussed in more detail below, an entry in the queue table 210 indicates a particular packet processing queue to assign. In the illustrative embodiment, the queue table index determiner 224 determines the queue table index based on the classification of the network packet in addition to the hash value generated based on the intrinsic entropy information and/or the entropy bucket selected based on the extrinsic entropy information. The illustrative queue table index determiner 224 may determine a queue group based on the classification of the network packet, where the queue group is a group of packet processing queues associated with a set of entries in the queue table that may be selected for assigning the network packet. A queue group may be indicated by, e.g., a first set of bits (such as a set of the most significant bits) of the queue table index. The illustrative queue table index determiner 224 may then determine a second set of bits (such as a set of the least significant bits) of the queue table index based on the hash value and/or the selected entropy bucket. When the hash value is used, the second set of bits may correspond to the least significant bits of the hash value. When the entropy bucket is used, the second set of bits may be based on the rules associated with the entropy bucket, as described in more detail below. When both the hash value and the entropy bucket is used, the second set of bits may be determined in any suitable manner, such as by adding a set of bits determined based on the hash value and a set of bits determined based on the entropy bucket. The first set of bits and the second set of bits may be combined to generate the queue table index, such as by setting the queue table index to have its most significant bits equal to the first set of bits and its least significant bits equal to the second set of bits. It should be appreciated that other approaches besides the approach described above for determining the queue table index may be used, such as by determining the queue table index only based on the selected entropy bucket.

The processor workload manager 204, which may be embodied as hardware, firmware, software, virtualized hardware, emulated architecture, and/or a combination thereof as discussed above, is configured to adjust certain parameters of the process for assigning network packets to packet processing queues in order to affect the workload of one or more of the processors 102. The processor workload manager 204 includes a processor workload determiner 226, a queue table updated 228, and an entropy bucket state manager 230.

The processor workload determiner 226 is configured to determine a processor workload associated with one or more processors 102. It should be appreciated that, as used herein, a processor workload may be the workload associated with a given processor 102 or the workload associated with a processor core of a given processor 102. The processor workload determiner 226 may determine the workload in any suitable manner, such as my determining an idle time of the processor 102 and/or processor cores, determining a number of network packets in a packet processing queue associated with the processor 102 and/or processor cores, etc.

The queue table updater 228 is configured to determine updated values for the queue table 210 based on the determined workloads associated with the processors 102. For example, the queue table updater 228 may add additional queue table entries associated with unused processors 102 or processor cores, may remove queue table entries associated with one or more processors 102 or processor cores, may modify queue table entries to change from indicating one packet processing queue to indicating another packet processing queue, etc.

The entropy bucket state manager 230 is configured to adjust the state of one or more of the entropy buckets 208 based on the determined workloads associated with the processors 102. For example, an entropy bucket may, as described in more detail below, indicate a present or recent workload of one or more processors 102, processor cores, and/or packet processing queues, and the entropy bucket state manager 230 may update the indication of the present or recent workload of one or more processors 102, processor cores, and/or packet processing queues based on the determined workloads associated with the processors 102. In another example, an entropy bucket may, as described in more detail below, indicate a desired distribution of workload among the packet processing queues 212, and the entropy bucket state manager 230 may modify the indication of the desired workload based on the determined workloads associated with the processors 102.

The entropy profiles 206 include one or more entropy profiles, each of which may include rules or other information usable to select a packet processing queue. For example, some embodiments of entropy profiles may indicate whether intrinsic entropy information, extrinsic entropy information, or both should be used to select one of the packet processing queues 212.

The entropy buckets 208 include one or more entropy buckets, each of which may include queue selection data, such as rules or other information usable to select a packet processing queue. One example of an entropy bucket is an entropy bucket that includes as queue selection data an index or other data for selecting a packet processing queue. After each access to the entropy bucket, the index or other data is incremented or otherwise updated so as to provide a basis for selecting a different packet processing queue. In another example of an entropy bucket, an entropy bucket may include an indication of desired distribution of network packets among the packet processing queues. The entropy bucket could indicate, e.g., that all of the packet processing queues should have equal workloads, that one packet processing queue should have more or less of a workload relative to other packet processing queues, etc. After accessing such an entropy bucket for a particular network packet, the network interface controller 202 may then select a random or pseudorandom number for selecting the packet processing queue, where the distribution or processing of the random or pseudorandom numbers that leads to a workload distribution similar to that indicated by the entropy bucket. In a third example of an entropy bucket, the entropy bucket may include an indication of a present or recent workload of one or more processors 102, processor cores, and/or packet processing queues. After accessing such an entropy bucket for a particular network packet, the network interface controller 202 may select a packet processing queue associated with a lower workload so as to distribute the workload more evenly across the packet processing queues, processors 102, and/or processor cores.

The queue table 210 includes one or more queue table entries, with each queue table entry providing an indication such as a memory location or other location index for one of the packet processing queues 212. In the illustrative embodiment, each queue table entry provides an indication for exactly one packet processing queue and each queue table entry provides an indication for a different packet processing queue. In other embodiments, different queue table entries may include an indication of the same packet processing queue.

The packet processing queues 212 include one or more packet processing queues for processing network packets. Each packet processing queue may be embodied as a queue data structure or other data structure which allows for storing network packets in an order. Each packet processing queue may be associated with and processed by one or more processors 102 or processor cores. In the illustrative embodiment, each packet processing queue is associated with one processor 102 or processor core and each processor core or processor 102 is associated with one packet processing queue.

Figure 3:
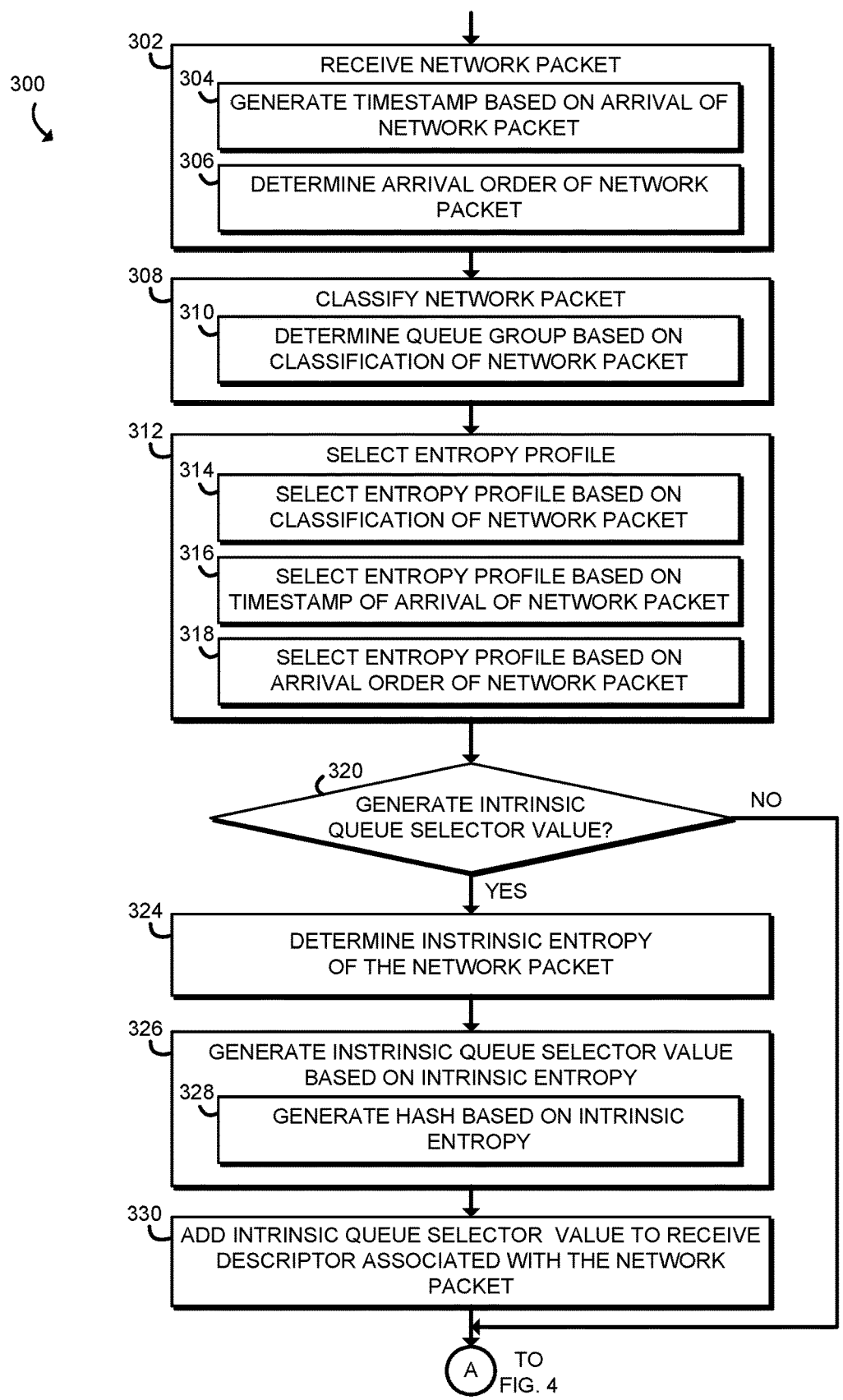
FIGS. 3-5 are a simplified flow diagram of at least one embodiment of a method for distributing network packet workload that may be executed by the compute device of FIG. 1.

Referring now to FIG. 3, in use, the compute device 100 may execute a method 300 for distributing network packet workload. The method 300 begins in block 302, in which the compute device 100 receives a network packet, such as from another compute device 100 over a network. The compute device 100 may generate a timestamp based on the arrival of the network packet in block 304. The compute device 100 may generate the timestamp with any suitable timer, such as a system clock associated with the processor 102, a clock associated with the network interface controller 108, a free-running clock, a clock based on a PTP such as IEEE 1588-2002 or IEEE 1588-200, etc. The compute device 100 may determine an arrival order of the network packet in block 306. The determined arrival order may be based on an arrival order of the network packet compared to associated network packets, such as the set of network packets associated with the same connection as the network packet.

In block 308, the compute device 100 classifies the network packet. The compute device 100 may classify a network packet based on various factors, such as the source IP address, the source port number, the destination IP address, the destination port number, the protocol in use by the network packet, tunneling properties of the network packet, etc. In some embodiments, the compute device 100 may classify a network packet based on related packets that have been received over a certain previous period of time. For example, the packet classifier 214 may classify a network packet based on the number of similar network packets (e.g., network packets with some or all of the same source IP address, source port number, destination IP address, destination port number, and/or protocol in use) that have been received over a certain period of time.

In block 310, the compute device 100 may determine a queue group based on the classification of the network packet. The queue group is a group of packet processing queues associated with a set of entries in the queue table that may be selected for assigning the network packet. A queue group may be indicated by, e.g., a first set of bits (such as a set of the most significant bits) of the queue table index.

In block 312, the compute device 100 selects one of the entropy profiles 206 to use in determining which of the packet processing queues 212 should be used to process the received network packet. As described in more detail above, the entropy profile may include rules or data that may be used to determine which packet processing queue the network packet is assigned to, such as whether intrinsic entropy information and/or extrinsic entropy information should be used in such a selecting the packet processing queue. The compute device 100 may use various factors to select an entropy profile for a given network packet. For example, the compute device 100 may in block 314 select the entropy profile based on the classification of the network packet determined in block 308. In another example, the compute device 100 may in block 316 select the entropy profile based on the timestamp of the arrival determined in block 304. In a third example, the compute device 100 may in block 318 select the entropy profile based on the arrival order of the network packet. In some embodiments, the compute device 100 may additionally or alternatively select an entropy profile based on some or all of the same factors used to classify the network packet, such as the source IP address, the source port number, the destination IP address, the destination port number, the protocol in use by the network packet, tunneling properties of the network packet, etc. In some embodiments, if an entropy profile cannot be found or no entropy profiles 206 are available, the compute device 100 may select a default entropy profile. The default entropy profile may indicate, e.g., that the intrinsic entropy information of the network packet should be used to select the packet processing queue.

In block 320, if the compute device 100 is to generate an intrinsic queue selection value because, e.g., the entropy profile so indicates, the method 300 proceeds to block 324, in which the compute device 100 determines the intrinsic entropy information associated with the network packet. Intrinsic entropy information refers to the information intrinsic to a network packet that may be used in selecting one of the packet processing queues 212 to assign the network packet to. The compute device may identify as intrinsic entropy information of the network packet any content of the network packet, such as the source IP address, the source port number, the destination IP address, the destination port number, the protocol in use by the network packet, tunneling properties of the network packet, etc.

In block 326, the compute device 100 generates an intrinsic queue selector value based on the intrinsic entropy information identified in block 324. The compute device 100 may generate the intrinsic queue selector value based on any suitable method. In some embodiments, the compute device 100 may provide the intrinsic entropy information as inputs to a hash function in block 328. In the illustrative embodiment, the compute device 100 combines the as the source IP address, the source port number, the destination IP address, the destination port number, the protocol in use by the network packet in a hash function to produce a hash value, which may be used as the intrinsic queue selector value. In block 330, the compute device 100 adds the intrinsic selector value to the receive descriptor associated with the network packet.

Figure 4:
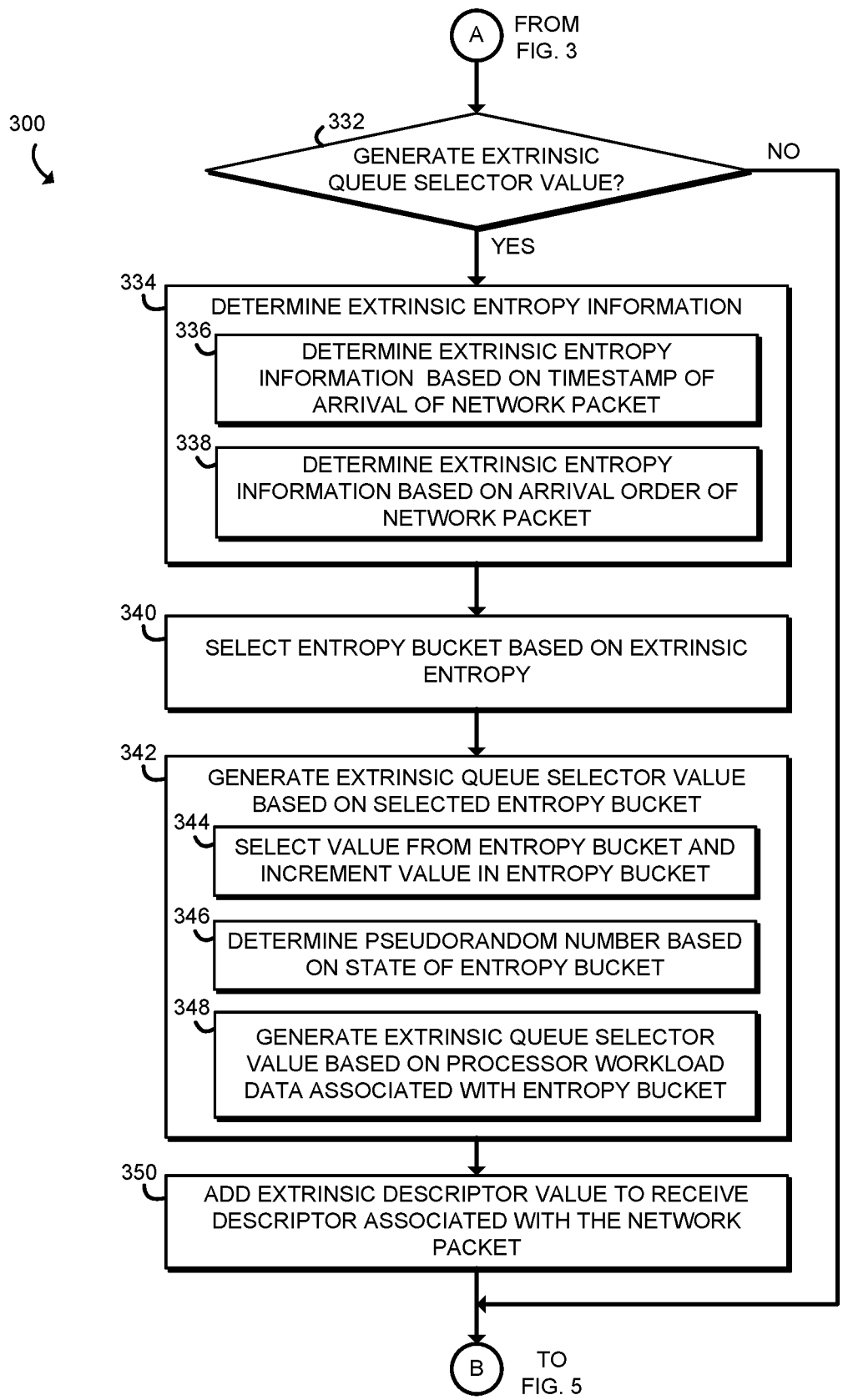

Referring back to block 320, if the compute device 100 is not to generate an intrinsic queue selection value, the method 300 proceeds to block 332 in FIG. 4, in which the compute device 100 decides whether or not to generate an extrinsic queue selector value. If the compute device 100 is to generate an extrinsic queue selection value because, e.g., the entropy profile so indicates, the method 300 proceeds to block 334, in which the compute device 100 determines extrinsic entropy information. Extrinsic entropy information is any information associated with a network packet that is not based on information intrinsic to the content of the network packet. In block 336, the compute device 100 may determine extrinsic entropy information based on the timestamp of the arrival of the network packet. The compute device 100 may directly use the value of the timestamp determined in block 304 as extrinsic entropy information without any further processing. In block 338, the compute device may determine extrinsic entropy information based on the arrival order of the network packet. The compute device 100 may directly use the value of the arrival order determined in block 306 as extrinsic entropy information without any further processing.

In block 340, the compute device 100 may select an entropy bucket based on the extrinsic entropy information. As discussed in more detail above, an entropy bucket may include queue selection data such as rules or data that may be used to determine which packet processing queue the network packet should be assigned to, such as a queue index associated with an entry in the queue table 210 that may be incremented after each use. In the illustrative embodiment, the compute device 100 selects one of the entropy buckets 208 based on the extrinsic entropy information determined in block 334. Additionally or alternatively, the compute device 100 may select one of the entropy buckets 208 based on other factors, such as the classification of the network packet and/or intrinsic entropy information of the packet.

In block 342, the compute device 100 may generate an extrinsic queue selector value based on the selected entropy bucket. In block 344, if the selected entropy bucket includes an index or other data for selecting a packet processing queue, the compute device 100 selects the index or other data and increments or otherwise updates the index or other data. In block 346, if the selected entropy bucket includes an indication of desired distribution of network packets among the packet processing queues, the compute device may select a random or pseudorandom number for selecting the packet processing queue, where the distribution or processing of the random or pseudorandom numbers that leads to a workload distribution similar to that indicated by the entropy bucket. In block 348, if the selected entropy bucket includes an indication of a present or recent workload of one or more processors 102, processor cores, and/or packet processing queues, the compute device may select an extrinsic queue selector value which will assign the network packet to a packet processor queue such that the workload is more evenly across the packet processing queues, processors 102, and/or processor cores. In block 350, the compute device 100 adds the extrinsic entropy information to the receive descriptor associated with the network packet.

Figure 5:
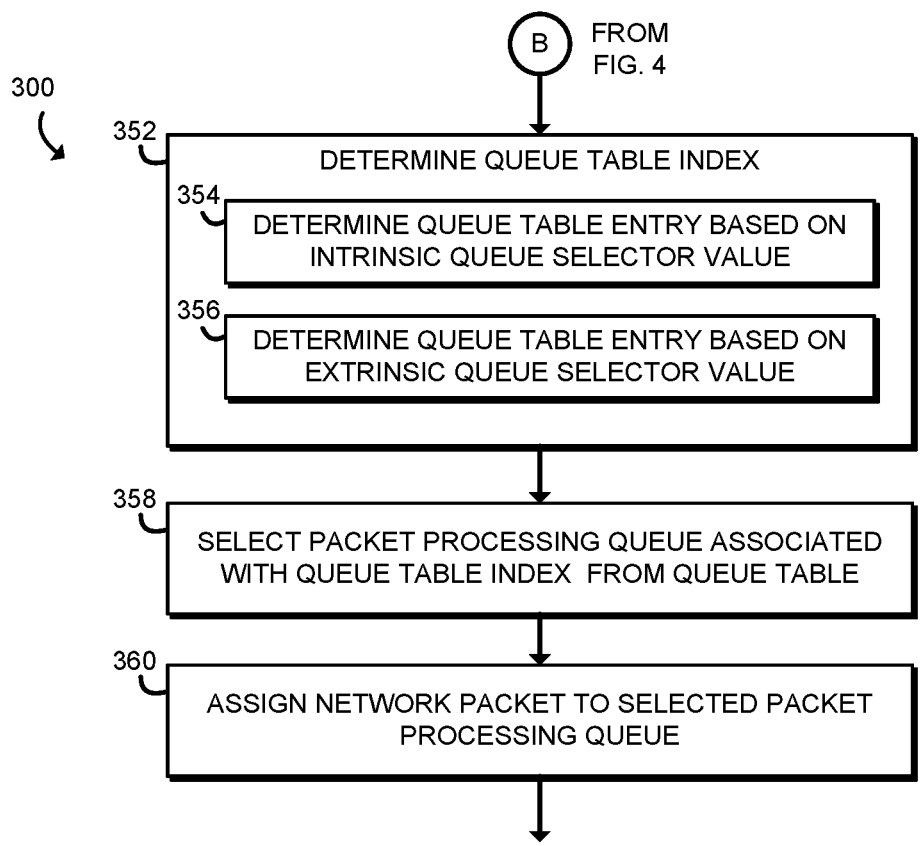

Referring back to block 332, if the compute device 100 is not to generate an extrinsic queue selection value, the method 300 proceeds to block 352 in FIG. 5, in which the compute device 100 determines a queue table index. In block 354, the compute device 100 may determine the queue table index based on the intrinsic queue selector value. In block 356, the compute device 100 may determine the queue table index based on the extrinsic queue selector value. In some embodiments, the compute device 100 may determine the queue table index on both the intrinsic selector value and the extrinsic selector value, such as by adding the intrinsic selector value to the extrinsic selector value. In the illustrative embodiment, the compute device 100 determines the queue table index also based on the queue group determined in block 310. For example, the queue group may be indicated by, e.g., a first set of bits (such as a set of the most significant bits) of the queue table index and the intrinsic queue selector value, the extrinsic queue selector value, and/or the combination of the intrinsic and/or the extrinsic selector value may be embodied as a second set of bits (such as a set of the least significant bits) of the queue table index. The first set of bits and the second set of bits may be combined to generate the queue table index, such as by setting the queue table index to have its most significant bits equal to the first set of bits and its least significant bits equal to the second set of bits.

In block 358, the compute device 100 access the queue entry indicated by the queue table index and selects the packet processing queue indicated by the queue entry. The queue entry may indicate a packet processing queue such as by specifying a memory location or other location indicator for the packet processing queue. In block 360, the compute device 100 assigns the network packet to the selected packet processing queue.

Figure 6:
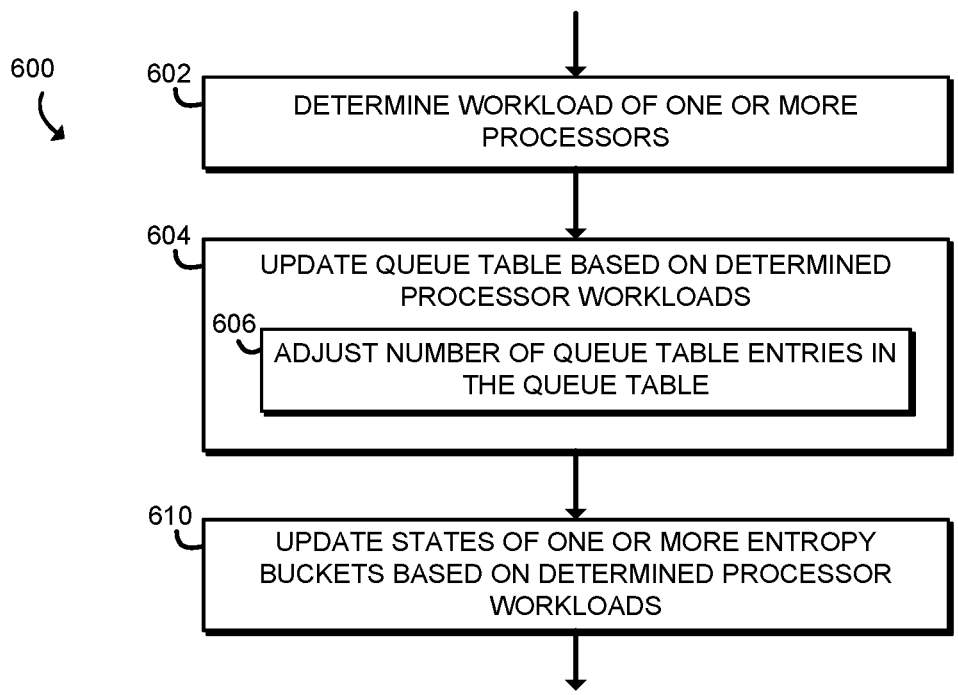
FIG. 6 is a simplified flow diagram of at least one embodiment of a method for updating parameters for distributing network packet workload that may be executed by the compute device of FIG. 1.

Referring now to FIG. 6, in use, the compute device 100 may execute a method 600 for updating parameters for distributing network packet workload. The method 600 begins in block 602, in which the compute device determines the workload associated with one or more processors 102 and/or processor cores. The compute device 100 may determine the workload in any suitable manner, such as my determining an idle time of the processor 102 and/or processor cores, determining a number of network packets in a packet processing queue associated with the processor 102 and/or processor cores, etc.

In block 604, the compute device updates the queue table values based on the determined workloads. For example, the compute device 100 may modify queue table entries to change from indicating one packet processing queue associated with a processor 102 and/or processor core with a higher workload to indicating another packet processing queue associated with a processor 102 and/or processor core with a lower workload. In block 606, the compute device 100 may adjust the number of queue table entries in the queue table. For example, the compute device 100 may add additional queue table entries associated with unused processors 102 or processor cores, may remove queue table entries associated with one or more processors 102 or processor cores, etc.

In block 610, the compute device 100 may update the states of one or more entropy buckets based on the determined workloads of the processors 102 and/or processor cores. For example, if an entropy bucket indicates a present or recent workload of one or more processors 102, processor cores, and/or packet processing queues, the compute device 100 may update the indication of the present or recent workload of one or more processors 102, processor cores, and/or packet processing queues based on the determined workloads associated with the processors 102. In another example, if entropy bucket indicates a desired distribution of workload among the packet processing queues 212, the compute device 100 may modify the indication of the desired workload based on the determined workloads associated with the processors 102.

EXAMPLES

Illustrative examples of the devices, systems, and methods disclosed herein are provided below. An embodiment of the devices, systems, and methods may include any one or more, and any combination of, the examples described below.

Example 1 includes a compute device for distributing network packet workload based on extrinsic entropy by a compute device, the compute device comprising a processor; a memory; a network interface controller to receive a network packet; determine network packet extrinsic entropy information, wherein the network packet extrinsic entropy information is not based on content of the network packet; select, based on the network packet extrinsic entropy information, a packet processing queue from a plurality of packet processing queues; and assign the network packet to the selected packet processing queue.

Example 2 includes the subject matter of Example 1, and wherein the network interface controller is further to determine information associated with a temporal characteristic of the arrival of the network packet at the compute device, wherein to determine the network packet extrinsic entropy information comprises to determine the network packet extrinsic entropy information based on the temporal characteristic of the arrival of the network packet.

Example 3 includes the subject matter of any of Examples 1 and 2, and wherein the network interface controller is further to determine a timestamp of the arrival time of the network packet, wherein the temporal characteristics of the arrival of the network packet is the timestamp of the arrival time, wherein to select, based on the network packet extrinsic entropy information, the packet processing queue from the plurality of packet processing queues comprises to select, based on the timestamp of the arrival time of the network packet, the packet processing queue from the plurality of packet processing queues.

Example 4 includes the subject matter of any of Examples 1-3, and wherein the network interface controller is further to determine an order of arrival of the network packet compared to associated network packets, wherein the temporal characteristics of the arrival of the network packet is the order of arrival of the network packet, wherein to select, based on the network packet extrinsic entropy information, the packet processing queue from the plurality of packet processing queues comprises to select, based on the order of arrival of the network packet, the packet processing queue from the plurality of packet processing queues.

Example 5 includes the subject matter of any of Examples 1-4, and wherein the network interface controller is further to classify, based on the content of the network packet, the network packet; and select, based on the classification of the network packet, an entropy profile indicating that extrinsic entropy should be used to select one of the plurality of packet processing queues, wherein to select, based on the network packet extrinsic entropy information, the packet processing queue from the plurality of packet processing queues comprises select, based on the network packet extrinsic entropy information, the packet processing queue from the plurality of packet processing queues in response to selection of the entropy profile indicating that extrinsic entropy should be used to select one of the plurality of packet processing queues.

Example 6 includes the subject matter of any of Examples 1-5, and wherein the selected entropy profile further indicates that intrinsic entropy should be used to select one of the plurality of packet processing queues, wherein the network interface controller is further to determine intrinsic entropy information, wherein the intrinsic entropy information is based on the content of the network packet; wherein to select, based on the network packet extrinsic entropy information, the packet processing queue from the plurality of packet processing queues in response to selection of the entropy profile indicating that extrinsic entropy should be used to select one of the plurality of packet processing queues comprises to select, based on the network packet extrinsic entropy information and the intrinsic entropy information, the packet processing queue from the plurality of packet processing queues in response to selection of the entropy profile indicating that extrinsic entropy and intrinsic entropy should be used to select one of the plurality of packet processing queues.

Example 7 includes the subject matter of any of Examples 1-6, and wherein the network interface controller is further to receive a second network packet; classify, based on the content of the second network packet, the second network packet; select, based on the classification of the second network packet, a second entropy profile indicating that intrinsic entropy should be used to select one of the plurality of packet processing queues; determine intrinsic entropy information associated with the second network packet, wherein the intrinsic entropy information is based on the content of the network packet; select, based on the intrinsic entropy information, a second packet processing queue from the plurality of packet processing queues in response to selection of the second entropy profile indicating that intrinsic entropy should be used to select one of the plurality of packet processing queues; and assign the second network packet to the selected second packet processing queue.

Example 8 includes the subject matter of any of Examples 1-7, and wherein the network interface controller is further to select, based on the network packet extrinsic entropy information, an entropy bucket from the plurality of entropy buckets, wherein each entropy bucket of the plurality of entropy buckets comprises corresponding queue selection data stored in the compute device usable to select one of the plurality of packet processing queues, wherein to select, based on the network packet extrinsic entropy information, the packet processing queue from the plurality of packet processing queues comprises to select, based on the selected entropy bucket, the packet processing queue from the plurality of packet processing queues.

Example 9 includes the subject matter of any of Examples 1-8, and wherein the queue selection data corresponding to the selected entropy bucket comprises a queue table index associated with the packet processing queue, wherein to select, based on the selected entropy bucket, the packet processing queue from the plurality of packet processing queues comprises to select, based on the selected entropy bucket, the packet processing queue corresponding to the queue table index included in the queue selection data corresponding to the selected entropy bucket, wherein the network interface controller is further to increment the queue table index included in the queue selection data corresponding to the selected entropy bucket in response to selection of the selected entropy bucket.

Example 10 includes the subject matter of any of Examples 1-9, and wherein the queue selection data corresponding to the selected entropy bucket comprises an indication of a desired distribution of network packets among the plurality of packet processing queues, wherein the network interface controller is further to determine a pseudo-random number based on the indication of the desired distribution of network packets among the plurality of processing queues, wherein to select, based on the selected entropy bucket, the packet processing queue from the plurality of packet processing queues comprises to select, based on the pseudo-random number, the packet processing queue from the plurality of packet processing queues.

Example 11 includes the subject matter of any of Examples 1-10, and wherein the queue selection data corresponding to the selected entropy bucket comprises an indication of a processor workload associated with each of the plurality packet processing queues, wherein to select, based on the selected entropy bucket, the packet processing queue from the plurality of packet processing queues comprises to select, based on the indication of the processor workload associated with each of the plurality of packet processing queues, the packet processing queue from the plurality of packet processing queues.

Example 12 includes the subject matter of any of Examples 1-11, and further including a processor workload manager to determine a processor workload for each of a plurality of processor cores, wherein each processor core of the plurality of processor cores is associated with one or more of packet processing queues of the plurality of packet processing queues; and update, based on the determined processor workload for each of the plurality of processor cores, the queue selection data associated with the selected entropy bucket.

Example 13 includes the subject matter of any of Examples 1-12, and wherein to select, based on the network packet extrinsic entropy information, the packet processing queue from a plurality of packet processing queues comprises to determine, based on the network packet extrinsic entropy information, a queue table index associated with a queue table entry of a plurality of queue table entries in a queue table; access, based on the determined queue table index, the queue table entry in the queue table; and select the packet processing queue associated with the queue table entry.

Example 14 includes the subject matter of any of Examples 1-13, and wherein the network interface controller is further to classify, based on the content of the network packet, the network packet; and determine, based on the classification of the network packet, a queue group of a plurality of queue groups, wherein each queue group of the plurality of queue groups comprises two or more packet processing queues of the plurality of packet processing queues, wherein to determine, based on the network packet extrinsic entropy information, the queue table index associated with the queue entry comprises to determine, based on the network packet extrinsic entropy information and the determined queue group, the queue table index associated with the queue entry.

Example 15 includes the subject matter of any of Examples 1-14, and wherein to determine, based on the network packet extrinsic entropy information and the determined queue group, the queue table index associated with the queue entry comprises to determine, based on the network packet extrinsic entropy information, an extrinsic queue selector value comprising a first set of bits, determine, based on the determined queue group, a second set of bits; combine the first set of bits and the second set of bits to generate the queue table index associated with the queue entry.

Example 16 includes the subject matter of any of Examples 1-15, and wherein the network interface controller is further to add, based on the network packet extrinsic entropy information, an extrinsic descriptor value to a receive descriptor.

Example 17 includes the subject matter of any of Examples 1-16, and further including a processor workload manager to determine a processor workload for each of a plurality of processor cores, wherein each processor core of the plurality of processor cores is associated with one or more of packet processing queues of the plurality of packet processing queues; determine, based on the determined processor workload for each of the plurality of processor cores, an updated value for each of one or more queue table entries of the plurality of queue table entries; and update each of the one or more queue table entries to the corresponding updated value.

Example 18 includes the subject matter of any of Examples 1-17, and wherein the processor workload manager is further to adjust the number of queue table entries in the queue table based on the determined processor loads.

Example 19 includes a method for distributing network packet workload based on extrinsic entropy by a compute device, the method comprising receiving, by the compute device, a network packet; determining, by the compute device, network packet extrinsic entropy information, wherein the network packet extrinsic entropy information is not based on content of the network packet; selecting, by the compute device and based on the network packet extrinsic entropy information, a packet processing queue from a plurality of packet processing queues; and assigning, by the compute device, the network packet to the selected packet processing queue.

Example 20 includes the subject matter of Example 19, and further including determining, by the compute device, information associated with a temporal characteristic of the arrival of the network packet at the compute device, wherein determining the network packet extrinsic entropy information comprises determining the network packet extrinsic entropy information based on the temporal characteristic of the arrival of the network packet.

Example 21 includes the subject matter of any of Examples 19 and 20, and further including determining, by the compute device, a timestamp of the arrival time of the network packet, wherein the temporal characteristics of the arrival of the network packet is the timestamp of the arrival time, wherein selecting, by the compute device and based on the network packet extrinsic entropy information, the packet processing queue from the plurality of packet processing queues comprises selecting, by the compute device and based on the timestamp of the arrival time of the network packet, the packet processing queue from the plurality of packet processing queues.

Example 22 includes the subject matter of any of Examples 19-21, and further including determining, by the compute device, an order of arrival of the network packet compared to associated network packets, wherein the temporal characteristics of the arrival of the network packet is the order of arrival of the network packet, wherein selecting, by the compute device and based on the network packet extrinsic entropy information, the packet processing queue from the plurality of packet processing queues comprises selecting, by the compute device and based on the order of arrival of the network packet, the packet processing queue from the plurality of packet processing queues.

Example 23 includes the subject matter of any of Examples 19-22, and further including classifying, by the compute device and based on the content of the network packet, the network packet; and selecting, by the compute device and based on the classification of the network packet, an entropy profile indicating that extrinsic entropy should be used to select one of the plurality of packet processing queues, wherein selecting, by the compute device and based on the network packet extrinsic entropy information, the packet processing queue from the plurality of packet processing queues comprises selecting, by the compute device and based on the network packet extrinsic entropy information, the packet processing queue from the plurality of packet processing queues in response to selection of the entropy profile indicating that extrinsic entropy should be used to select one of the plurality of packet processing queues.

Example 24 includes the subject matter of any of Examples 19-23, and wherein the selected entropy profile further indicates that intrinsic entropy should be used to select one of the plurality of packet processing queues, the method further comprising determining, by the compute device, intrinsic entropy information, wherein the intrinsic entropy information is based on the content of the network packet; wherein selecting, by the compute device and based on the network packet extrinsic entropy information, the packet processing queue from the plurality of packet processing queues in response to selection of the entropy profile indicating that extrinsic entropy should be used to select one of the plurality of packet processing queues comprises selecting, by the compute device and based on the network packet extrinsic entropy information and the intrinsic entropy information, the packet processing queue from the plurality of packet processing queues in response to selection of the entropy profile indicating that extrinsic entropy and intrinsic entropy should be used to select one of the plurality of packet processing queues.

Example 25 includes the subject matter of any of Examples 19-24, and further including receiving, by the compute device, a second network packet; classifying, by the compute device and based on the content of the second network packet, the second network packet; selecting, by the compute device and based on the classification of the second network packet, a second entropy profile indicating that intrinsic entropy should be used to select one of the plurality of packet processing queues; determining, by the compute device, intrinsic entropy information associated with the second network packet, wherein the intrinsic entropy information is based on the content of the network packet; selecting, by the compute device and based on the intrinsic entropy information, a second packet processing queue from the plurality of packet processing queues in response to selection of the second entropy profile indicating that intrinsic entropy should be used to select one of the plurality of packet processing queues; and assigning, by the compute device, the second network packet to the selected second packet processing queue.

Example 26 includes the subject matter of any of Examples 19-25, and further including selecting, by the compute device and based on the network packet extrinsic entropy information, an entropy bucket from the plurality of entropy buckets, wherein each entropy bucket of the plurality of entropy buckets comprises corresponding queue selection data stored in the compute device usable to select one of the plurality of packet processing queues, wherein selecting, by the compute device and based on the network packet extrinsic entropy information, the packet processing queue from the plurality of packet processing queues comprises selecting, by the compute device and based on the selected entropy bucket, the packet processing queue from the plurality of packet processing queues.

Example 27 includes the subject matter of any of Examples 19-26, and wherein the queue selection data corresponding to the selected entropy bucket comprises a queue table index associated with the packet processing queue, wherein selecting, by the compute device and based on the selected entropy bucket, the packet processing queue from the plurality of packet processing queues comprises selecting, by the compute device and based on the selected entropy bucket, the packet processing queue corresponding to the queue table index included in the queue selection data corresponding to the selected entropy bucket, the method further comprising incrementing the queue table index included in the queue selection data corresponding to the selected entropy bucket in response to selection of the selected entropy bucket.

Example 28 includes the subject matter of any of Examples 19-27, and wherein the queue selection data corresponding to the selected entropy bucket comprises an indication of a desired distribution of network packets among the plurality of packet processing queues, the method further comprising determining, by the compute device, a pseudo-random number based on the indication of the desired distribution of network packets among the plurality of processing queues, wherein selecting, by the compute device and based on the selected entropy bucket, the packet processing queue from the plurality of packet processing queues comprises selecting, by the compute device and based on the pseudo-random number, the packet processing queue from the plurality of packet processing queues.

Example 29 includes the subject matter of any of Examples 19-28, and wherein the queue selection data corresponding to the selected entropy bucket comprises an indication of a processor workload associated with each of the plurality packet processing queues, wherein selecting, by the compute device and based on the selected entropy bucket, the packet processing queue from the plurality of packet processing queues comprises selecting, by the compute device and based on the indication of the processor workload associated with each of the plurality of packet processing queues, the packet processing queue from the plurality of packet processing queues.

Example 30 includes the subject matter of any of Examples 19-29, and further including determining, by the compute device, a processor workload for each of a plurality of processor cores, wherein each processor core of the plurality of processor cores is associated with one or more of packet processing queues of the plurality of packet processing queues; and updating, by the compute device and based on the determined processor workload for each of the plurality of processor cores, the queue selection data associated with the selected entropy bucket.

Example 31 includes the subject matter of any of Examples 19-30, and wherein selecting, by the compute device and based on the network packet extrinsic entropy information, the packet processing queue from a plurality of packet processing queues comprises determining, by the compute device and based on the network packet extrinsic entropy information, a queue table index associated with a queue table entry of a plurality of queue table entries in a queue table; accessing, by the compute device and based on the determined queue table index, the queue table entry in the queue table; and selecting, by the compute device, the packet processing queue associated with the queue table entry.

Example 32 includes the subject matter of any of Examples 19-31, and further including classifying, by the compute device and based on the content of the network packet, the network packet; and determining, by the compute device and based on the classification of the network packet, a queue group of a plurality of queue groups, wherein each queue group of the plurality of queue groups comprises two or more packet processing queues of the plurality of packet processing queues, wherein determining, by the compute device and based on the network packet extrinsic entropy information, the queue table index associated with the queue entry comprises determining, by the compute device and based on the network packet extrinsic entropy information and the determined queue group, the queue table index associated with the queue entry.

Example 33 includes the subject matter of any of Examples 19-32, and wherein determining, by the compute device and based on the network packet extrinsic entropy information and the determined queue group, the queue table index associated with the queue entry comprises determining, by the compute device and based on the network packet extrinsic entropy information, an extrinsic queue selector value comprising a first set of bits, determining, by the compute device and based on the determined queue group, a second set of bits; combining, by the compute device, the first set of bits and the second set of bits to generate the queue table index associated with the queue entry.

Example 34 includes the subject matter of any of Examples 19-33, and further including adding, by the compute device and based on the network packet extrinsic entropy information, an extrinsic descriptor value to a receive descriptor.

Example 35 includes the subject matter of any of Examples 19-34, and further including determining, by the compute device, a processor workload for each of a plurality of processor cores, wherein each processor core of the plurality of processor cores is associated with one or more of packet processing queues of the plurality of packet processing queues; determining, by the compute device and based on the determined processor workload for each of the plurality of processor cores, an updated value for each of one or more queue table entries of the plurality of queue table entries; and updating, by the compute device, each of the one or more queue table entries to the corresponding updated value.

Example 36 includes the subject matter of any of Examples 19-35, and further including adjusting, by the compute device, the number of queue table entries in the queue table based on the determined processor loads.

Example 37 includes one or more computer-readable media comprising a plurality of instructions stored thereon that, when executed, causes a compute device to perform the method of any of Examples 20-36.

Example 38 includes a compute device for distributing network packet workload based on extrinsic entropy by a compute device, the compute device comprising circuitry for receiving a network packet; means for determining network packet extrinsic entropy information, wherein the network packet extrinsic entropy information is not based on content of the network packet; means for selecting, based on the network packet extrinsic entropy information, a packet processing queue from a plurality of packet processing queues; and means for assigning the network packet to the selected packet processing queue.

Example 39 includes the subject matter of Example 38, and further including means for determining information associated with a temporal characteristic of the arrival of the network packet at the compute device, wherein the means for determining the network packet extrinsic entropy information comprises means for determining the network packet extrinsic entropy information based on the temporal characteristic of the arrival of the network packet.

Example 40 includes the subject matter of any of Examples 38 and 39, and further including means for determining a timestamp of the arrival time of the network packet, wherein the temporal characteristics of the arrival of the network packet is the timestamp of the arrival time, wherein the means for selecting, based on the network packet extrinsic entropy information, the packet processing queue from the plurality of packet processing queues comprises means for selecting, based on the timestamp of the arrival time of the network packet, the packet processing queue from the plurality of packet processing queues.

Example 41 includes the subject matter of any of Examples 38-40, and further including means for determining an order of arrival of the network packet compared to associated network packets, wherein the temporal characteristics of the arrival of the network packet is the order of arrival of the network packet, wherein the means for selecting, based on the network packet extrinsic entropy information, the packet processing queue from the plurality of packet processing queues comprises means for selecting, based on the order of arrival of the network packet, the packet processing queue from the plurality of packet processing queues.

Example 42 includes the subject matter of any of Examples 38-41, and further including means for classifying, based on the content of the network packet, the network packet; and means for selecting, based on the classification of the network packet, an entropy profile indicating that extrinsic entropy should be used to select one of the plurality of packet processing queues, wherein the means for selecting, based on the network packet extrinsic entropy information, the packet processing queue from the plurality of packet processing queues comprises means for selecting, based on the network packet extrinsic entropy information, the packet processing queue from the plurality of packet processing queues in response to selection of the entropy profile indicating that extrinsic entropy should be used to select one of the plurality of packet processing queues.

Example 43 includes the subject matter of any of Examples 38-42, and wherein the selected entropy profile further indicates that intrinsic entropy should be used to select one of the plurality of packet processing queues, the method further comprising means for determining intrinsic entropy information, wherein the intrinsic entropy information is based on the content of the network packet; wherein the means for selecting, based on the network packet extrinsic entropy information, the packet processing queue from the plurality of packet processing queues in response to selection of the entropy profile indicating that extrinsic entropy should be used to select one of the plurality of packet processing queues comprises means for selecting, based on the network packet extrinsic entropy information and the intrinsic entropy information, the packet processing queue from the plurality of packet processing queues in response to selection of the entropy profile indicating that extrinsic entropy and intrinsic entropy should be used to select one of the plurality of packet processing queues.

Example 44 includes the subject matter of any of Examples 38-43, and further including circuitry for receiving a second network packet; means for classifying, based on the content of the second network packet, the second network packet; means for selecting, based on the classification of the second network packet, a second entropy profile indicating that intrinsic entropy should be used to select one of the plurality of packet processing queues; means for determining intrinsic entropy information associated with the second network packet, wherein the intrinsic entropy information is based on the content of the network packet; means for selecting, based on the intrinsic entropy information, a second packet processing queue from the plurality of packet processing queues in response to selection of the second entropy profile indicating that intrinsic entropy should be used to select one of the plurality of packet processing queues; and means for assigning the second network packet to the selected second packet processing queue.

Example 45 includes the subject matter of any of Examples 38-44, and further including means for selecting, based on the network packet extrinsic entropy information, an entropy bucket from the plurality of entropy buckets, wherein each entropy bucket of the plurality of entropy buckets comprises corresponding queue selection data stored in the compute device usable to select one of the plurality of packet processing queues, wherein the means for selecting, based on the network packet extrinsic entropy information, the packet processing queue from the plurality of packet processing queues comprises means for selecting, based on the selected entropy bucket, the packet processing queue from the plurality of packet processing queues.

Example 46 includes the subject matter of any of Examples 38-45, and wherein the queue selection data corresponding to the selected entropy bucket comprises a queue table index associated with the packet processing queue, wherein the means for selecting, based on the selected entropy bucket, the packet processing queue from the plurality of packet processing queues comprises means for selecting, based on the selected entropy bucket, the packet processing queue corresponding to the queue table index included in the queue selection data corresponding to the selected entropy bucket, the method further comprising means for incrementing the queue table index included in the queue selection data corresponding to the selected entropy bucket in response to selection of the selected entropy bucket.

Example 47 includes the subject matter of any of Examples 38-46, and wherein the queue selection data corresponding to the selected entropy bucket comprises an indication of a desired distribution of network packets among the plurality of packet processing queues, the method further comprising determining a pseudo-random number based on the indication of the desired distribution of network packets among the plurality of processing queues, wherein the means for selecting, based on the selected entropy bucket, the packet processing queue from the plurality of packet processing queues comprises means for selecting, based on the pseudo-random number, the packet processing queue from the plurality of packet processing queues.

Example 48 includes the subject matter of any of Examples 38-47, and wherein the queue selection data corresponding to the selected entropy bucket comprises an indication of a processor workload associated with each of the plurality packet processing queues, wherein the means for selecting, based on the selected entropy bucket, the packet processing queue from the plurality of packet processing queues comprises means for selecting, based on the indication of the processor workload associated with each of the plurality of packet processing queues, the packet processing queue from the plurality of packet processing queues.

Example 49 includes the subject matter of any of Examples 38-48, and further including means for determining a processor workload for each of a plurality of processor cores, wherein each processor core of the plurality of processor cores is associated with one or more of packet processing queues of the plurality of packet processing queues; and means for updating, based on the determined processor workload for each of the plurality of processor cores, the queue selection data associated with the selected entropy bucket.

Example 50 includes the subject matter of any of Examples 38-49, and wherein the means for selecting, based on the network packet extrinsic entropy information, the packet processing queue from a plurality of packet processing queues comprises means for determining, based on the network packet extrinsic entropy information, a queue table index associated with a queue table entry of a plurality of queue table entries in a queue table; means for accessing, based on the determined queue table index, the queue table entry in the queue table; and means for selecting the packet processing queue associated with the queue table entry.

Example 51 includes the subject matter of any of Examples 38-50, and further including means for classifying, based on the content of the network packet, the network packet; and means for determining, based on the classification of the network packet, a queue group of a plurality of queue groups, wherein each queue group of the plurality of queue groups comprises two or more packet processing queues of the plurality of packet processing queues, wherein the means for determining, based on the network packet extrinsic entropy information, the queue table index associated with the queue entry comprises means for determining, based on the network packet extrinsic entropy information and the determined queue group, the queue table index associated with the queue entry.

Example 52 includes the subject matter of any of Examples 38-51, and wherein the means for determining, based on the network packet extrinsic entropy information and the determined queue group, the queue table index associated with the queue entry comprises means for determining, based on the network packet extrinsic entropy information, an extrinsic queue selector value comprising a first set of bits, means for determining, based on the determined queue group, a second set of bits; means for combining the first set of bits and the second set of bits to generate the queue table index associated with the queue entry.

Example 53 includes the subject matter of any of Examples 38-52, and further including means for adding, based on the network packet extrinsic entropy information, an extrinsic descriptor value to a receive descriptor.

Example 54 includes the subject matter of any of Examples 38-53, and further including means for determining a processor workload for each of a plurality of processor cores, wherein each processor core of the plurality of processor cores is associated with one or more of packet means for processing queues of the plurality of packet processing queues; means for determining, based on the determined processor workload for each of the plurality of processor cores, an updated value for each of one or more queue table entries of the plurality of queue table entries; and means for updating each of the one or more queue table entries to the corresponding updated value.

Example 55 includes the subject matter of any of Examples 38-54, and further including means for adjusting the number of queue table entries in the queue table based on the determined processor loads.

The invention claimed is:

1. A compute device for distributing network packet workload based on extrinsic entropy information, the compute device comprising:
   a processor;
   a memory;
   a network interface controller to:
      receive a network packet;
      determine network packet extrinsic entropy information, wherein the network packet extrinsic entropy information is not based on content of the network packet;
      select, based on the network packet extrinsic entropy information, an entropy bucket from a plurality of entropy buckets, wherein at least one entropy bucket of the plurality of entropy buckets comprises corresponding queue selection data stored in the compute device usable to select one of a plurality of packet processing queues;
      select, based on the network packet extrinsic entropy information, a packet processing queue from a plurality of packet processing queues, wherein to select, based on the network packet extrinsic entropy information, the packet processing queue from the plurality of packet processing queues comprises to select, based on the selected entropy bucket, the packet processing queue from the plurality of packet processing queues; and
      assign the network packet to the selected packet processing queue.

2. The compute device of claim 1, wherein the network interface controller is further to determine information associated with a temporal characteristic of arrival of the network packet at the compute device,
   wherein to determine the network packet extrinsic entropy information comprises to determine the network packet extrinsic entropy information based on the temporal characteristic of the arrival of the network packet.

3. The compute device of claim 2, wherein the network interface controller is further to determine a timestamp of an arrival time of the network packet, wherein the temporal characteristic of the arrival of the network packet comprises the timestamp of the arrival time,
   wherein to select, based on the network packet extrinsic entropy information, the packet processing queue from the plurality of packet processing queues comprises to select, based on the timestamp of the arrival time of the network packet, the packet processing queue from the plurality of packet processing queues.

4. The compute device of claim 2, wherein the network interface controller is further to determine an order of arrival of the network packet compared to associated network packets, wherein the temporal characteristic of the arrival of the network packet comprises the order of arrival of the network packet,
   wherein to select, based on the network packet extrinsic entropy information, the packet processing queue from the plurality of packet processing queues comprises to select, based on the order of arrival of the network packet, the packet processing queue from the plurality of packet processing queues.

5. The compute device of claim 1, wherein the queue selection data corresponding to the selected entropy bucket comprises a queue table index associated with the packet processing queue,
   wherein to select, based on the selected entropy bucket, the packet processing queue from the plurality of packet processing queues comprises to select, based on the selected entropy bucket, the packet processing queue corresponding to the queue table index included in the queue selection data corresponding to the selected entropy bucket,
   wherein the network interface controller is further to increment the queue table index included in the queue selection data corresponding to the selected entropy bucket in response to selection of the selected entropy bucket.

6. The compute device of claim 1, wherein the queue selection data corresponding to the selected entropy bucket comprises an indication of a desired distribution of network packets among the plurality of packet processing queues,
   wherein the network interface controller is further to determine a pseudo-random number based on the indication of the desired distribution of network packets among the plurality of packet processing queues,
   wherein to select, based on the selected entropy bucket, the packet processing queue from the plurality of packet processing queues comprises to select, based on the pseudo-random number, the packet processing queue from the plurality of packet processing queues.

7. The compute device of claim 1, wherein the queue selection data corresponding to the selected entropy bucket comprises an indication of a processor workload associated with at least one of the plurality packet processing queues,
   wherein to select, based on the selected entropy bucket, the packet processing queue from the plurality of packet processing queues comprises to select, based on the indication of the processor workload associated with at least one of the plurality of packet processing queues, the packet processing queue from the plurality of packet processing queues.

8. A method for distributing network packet workload based on extrinsic entropy information by a compute device, the method comprising:
   receiving, by the compute device, a network packet;
   determining, by the compute device, network packet extrinsic entropy information, wherein the network packet extrinsic entropy information is not based on content of the network packet;
   selecting, by the compute device and based on the network packet extrinsic entropy information, an entropy bucket from a plurality of entropy buckets, wherein at least one entropy bucket of the plurality of entropy buckets comprises corresponding queue selection data stored in the compute device usable to select one of a plurality of packet processing queues;
   selecting, by the compute device and based on the network packet extrinsic entropy information, a packet processing queue from a plurality of packet processing queues, wherein selecting, by the compute device and based on the network packet extrinsic entropy information, the packet processing queue from the plurality of packet processing queues comprises selecting, by the compute device and based on the selected entropy bucket, the packet processing queue from the plurality of packet processing queues; and
   assigning, by the compute device, the network packet to the selected packet processing queue.

9. The method of claim 8, further comprising determining, by the compute device, information associated with a temporal characteristic of arrival of the network packet at the compute device,
wherein determining the network packet extrinsic entropy information comprises determining the network packet extrinsic entropy information based on the temporal characteristic of the arrival of the network packet.

10. The method of claim 9, further comprising determining, by the compute device, a timestamp of an arrival time of the network packet, wherein the temporal characteristic of the arrival of the network packet comprises the timestamp of the arrival time,
wherein selecting, by the compute device and based on the network packet extrinsic entropy information, the packet processing queue from the plurality of packet processing queues comprises selecting, by the compute device and based on the timestamp of the arrival time of the network packet, the packet processing queue from the plurality of packet processing queues.

11. The method of claim 9, further comprising determining, by the compute device, an order of arrival of the network packet compared to associated network packets, wherein the temporal characteristic of the arrival of the network packet comprises the order of arrival of the network packet,
wherein selecting, by the compute device and based on the network packet extrinsic entropy information, the packet processing queue from the plurality of packet processing queues comprises selecting, by the compute device and based on the order of arrival of the network packet, the packet processing queue from the plurality of packet processing queues.

12. The method of claim 8, wherein the queue selection data corresponding to the selected entropy bucket comprises an indication of a desired distribution of network packets among the plurality of packet processing queues,
the method further comprising determining, by the compute device, a pseudo-random number based on the indication of the desired distribution of network packets among the plurality of packet processing queues,
wherein selecting, by the compute device and based on the selected entropy bucket, the packet processing queue from the plurality of packet processing queues comprises selecting, by the compute device and based on the pseudo-random number, the packet processing queue from the plurality of packet processing queues.

13. The method of claim 8, wherein the queue selection data corresponding to the selected entropy bucket comprises an indication of a processor workload associated with at least one of the plurality packet processing queues,
wherein selecting, by the compute device and based on the selected entropy bucket, the packet processing queue from the plurality of packet processing queues comprises selecting, by the compute device and based on the indication of the processor workload associated with at least one of the plurality of packet processing queues, the packet processing queue from the plurality of packet processing queues.

14. One or more non-transitory computer-readable media comprising a plurality of instructions stored thereon that, when executed, causes a network interface controller of a compute device to:
receive a network packet;
determine network packet extrinsic entropy information, wherein the network packet extrinsic entropy information is not based on content of the network packet;
select, based on the network packet extrinsic entropy information, an entropy bucket from a plurality of entropy buckets, wherein at least one entropy bucket of the plurality of entropy buckets comprises corresponding queue selection data stored in the compute device usable to select one of a plurality of packet processing queues;
select, based on the network packet extrinsic entropy information, a packet processing queue from a plurality of packet processing queues, wherein to select, based on the network packet extrinsic entropy information, the packet processing queue from the plurality of packet processing queues comprises to select, based on the selected entropy bucket, the packet processing queue from the plurality of packet processing queues; and
assign the network packet to the selected packet processing queue.

15. The one or more non-transitory computer-readable media of claim 14, wherein the plurality of instructions further causes the network interface controller to determine information associated with a temporal characteristic of arrival of the network packet at the compute device,
wherein to determine the network packet extrinsic entropy information comprises to determine the network packet extrinsic entropy information based on the temporal characteristic of the arrival of the network packet.

16. The one or more non-transitory computer-readable media of claim 15, wherein the plurality of instructions further causes the network interface controller to determine a timestamp of an arrival time of the network packet, wherein the temporal characteristic of the arrival of the network packet comprises the timestamp of the arrival time,
wherein to select, based on the network packet extrinsic entropy information, the packet processing queue from the plurality of packet processing queues comprises to select, based on the timestamp of the arrival time of the network packet, the packet processing queue from the plurality of packet processing queues.

17. The one or more non-transitory computer-readable media of claim 15, the plurality of instructions further causes the network interface controller to determine an order of arrival of the network packet compared to associated network packets, wherein the temporal characteristic of the arrival of the network packet comprises the order of arrival of the network packet,
wherein to select, based on the network packet extrinsic entropy information, the packet processing queue from the plurality of packet processing queues comprises to select, based on the order of arrival of the network packet, the packet processing queue from the plurality of packet processing queues.

18. The one or more non-transitory computer-readable media of claim 14, wherein the queue selection data corresponding to the selected entropy bucket comprises an indication of a desired distribution of network packets among the plurality of packet processing queues,
wherein the plurality of instructions further causes the network interface controller to determine a pseudo-random number based on the indication of the desired distribution of network packets among the plurality of packet processing queues,
wherein to select, based on the selected entropy bucket, the packet processing queue from the plurality of packet processing queues comprises to select, based on the pseudo-random number, the packet processing queue from the plurality of packet processing queues.

19. The one or more non-transitory computer-readable media of claim 14, wherein the queue selection data corresponding to the selected entropy bucket comprises an indication of a processor workload associated with at least one of the plurality packet processing queues, wherein to select, based on the selected entropy bucket, the packet processing queue from the plurality of packet processing queues comprises to select, based on the indication of the processor workload associated with at least one of the plurality of packet processing queues, the packet processing queue from the plurality of packet processing queues.

20. A compute device for distributing network packet workload based on extrinsic entropy information by a compute device, the compute device comprising:

circuitry for receiving a network packet;

means for determining network packet extrinsic entropy information, wherein the network packet extrinsic entropy information is not based on content of the network packet;

means for selecting, based on the network packet extrinsic entropy information, an entropy bucket from a plurality of entropy buckets, wherein at least one entropy bucket of the plurality of entropy buckets comprises corresponding queue selection data stored in the compute device usable to select one of a plurality of packet processing queues;

means for selecting, based on the network packet extrinsic entropy information, a packet processing queue from a plurality of packet processing queues, wherein the means for selecting, based on the network packet extrinsic entropy information, the packet processing queue from the plurality of packet processing queues comprises means for selecting, based on the selected entropy bucket, the packet processing queue from the plurality of packet processing queues; and means for assigning the network packet to the selected packet processing queue.

21. The compute device of claim 20, further comprising means for determining information associated with a temporal characteristic of arrival of the network packet at the compute device, wherein the means for determining the network packet extrinsic entropy information comprises means for determining the network packet extrinsic entropy information based on the temporal characteristic of the arrival of the network packet.

\* \* \* \* \*